(12) United States Patent
Martin et al.

(10) Patent No.: US 6,352,042 B1
(45) Date of Patent: Mar. 5, 2002

(54) INTERNAL SEED KNOCKOUT ASSEMBLY

(75) Inventors: Robert Wallace Martin, Park View, IA (US); Netza Portillo, Coal Valley; James Irwin Lodico, Hampton, both of IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/685,808

(22) Filed: Oct. 10, 2000

(51) Int. Cl.[7] .................................................. A01C 7/04
(52) U.S. Cl. ........................................ 111/184; 221/211
(58) Field of Search ............................ 111/77, 177, 178, 111/181, 182, 183, 184, 185; 221/211, 263, 266, 278, 254, 265, 277

(56) References Cited

U.S. PATENT DOCUMENTS

| | | | |
|---|---|---|---|
| 3,486,659 A | * 12/1969 | Beebe et al. | 111/177 |
| 3,552,601 A | * 1/1971 | Hansen et al. | 111/77 |
| 4,609,131 A | 9/1986 | Tieben | 222/278 |
| 4,793,511 A | 12/1988 | Ankum et al. | 221/211 |
| 5,027,725 A | * 7/1991 | Keeton | 111/184 |
| 5,170,909 A | * 12/1992 | Lundie et al. | 221/211 |
| 5,784,985 A | 7/1998 | Lodico et al. | 111/184 |

FOREIGN PATENT DOCUMENTS

DE 36 15 189 4/1987 ............ A01C/7/04

OTHER PUBLICATIONS

Deere & Company Operator's Manual entitled 7340 narrow-Row MaxEmerge®2 Integral planters, OM–H135749 Issue L7, pp. 120–12 thru 120–16, 1987,printed in the USA, 1984.

* cited by examiner

Primary Examiner—Robert E. Pezzuto

(57) ABSTRACT

A seed meter is provided with a stationary housing having an inlet for receiving seed and an outlet for dispensing metered seed. A rotatable circular member is located adjacent the stationary housing and forms a seed puddle there between. The circular member is provided with seed receiving cells for transporting individual seeds from the seed puddle to the outlet. An internal seed knockout assembly having a rotatable wheel drives trapped seed from seed receiving cells into the outlet.

17 Claims, 4 Drawing Sheets

INTERNAL SEED KNOCKOUT ASSEMBLY

BACKGROUND OF THE INVENTION

1. Field of the Invention

The present invention is directed to improvements in a mechanical seed meter having an internally mounted seed knockout assembly.

2. Description of the Prior Art

In the United States the vast majority of crops are planted with row crop planters, grain drills or air seeders. Row crop planters are designed to place seeds in rows far enough apart to permit the control of weeds by cultivation and to improve harvesting efficiency. Grain drills and air seeders are used in solid planting, when row spacing is too close to permit cultivating or other cultural practices.

All three seeding machines, meter seed so it can be planted uniformly in a field. The row crop planters usually have the more sophisticated metering equipment for singling seeds, whereas the drills and air seeders use volumetric meters which apply a fixed volume of seed per linear foot.

Mechanical seed meters used on row crop planters include seed plate meters, finger pickup meters and "brush meters". In a "brush meter", a rotating circular member having a plurality of seed receiving cells passes through a seed puddle. Seed is trapped in the seed receiving cells by brushes. Brush meters may also be provided with external seed knockout assemblies for freeing trapped seeds from the seed cells, see U.S. Pat. No. 5,784,985. These external seed knockout assemblies are currently used on "brush meters" marketed by the assignee of the present patent application. However, the knockout wheels used on the production versions are sprocket wheels having outwardly extending radial teeth that enter the seed receiving cells to release trapped seed. With these externally mounted seed knockout assemblies, the trapped seed is returned to the seed puddle. As such, the seed meter has skipped a planting location because of the jammed seed receiving cell. In addition, the previously trapped seed may again enter the same or another seed receiving cell and become trapped again because of that seed's unique geometry.

SUMMARY OF THE INVENTION

It is an object of the present invention to provide a simple and effective internally mounted seed knockout assembly for a seed meter.

It is a feature of the present invention that the internal knockout assembly is an integral part of the brush retainer ring of a brush meter.

A brush meter is provided with a stationary housing having an inlet for receiving seed from a seed hopper and an outlet through which metered seed is dispensed into a seed tube. A brush retainer ring is mounted to the stationary housing. The brush retainer ring is provided with a radially extending brush that together with the stationary housing defines a seed trapping zone. A bowl having a plurality of seed receiving cells located about its periphery is rotatively mounted to the housing. The seed receiving cells cooperate with the seed trapping zone to trap single seeds. The individual seeds are released from the seed cells at the outlet. An internally mounted seed knockout assembly positively ejects trapped or jammed seeds from the seed receiving cells. The seed knockout assembly comprises a rotatable sprocket wheel having radially raised teeth that enter the individual seed cells of the bowl driving the trapped seed into the outlet. Therefore a seeding location is not skipped by a trapped seed.

The internal seed knockout assembly is an integral part of the brush retainer ring. The brush retainer ring shields the knockout sprocket from the seed in the seed puddle. In addition, the brush retainer ring is provided with a shaft on which the sprocket wheel rotates.

DESCRIPTION OF THE PREFERRED EMBODIMENT

Figure 1:
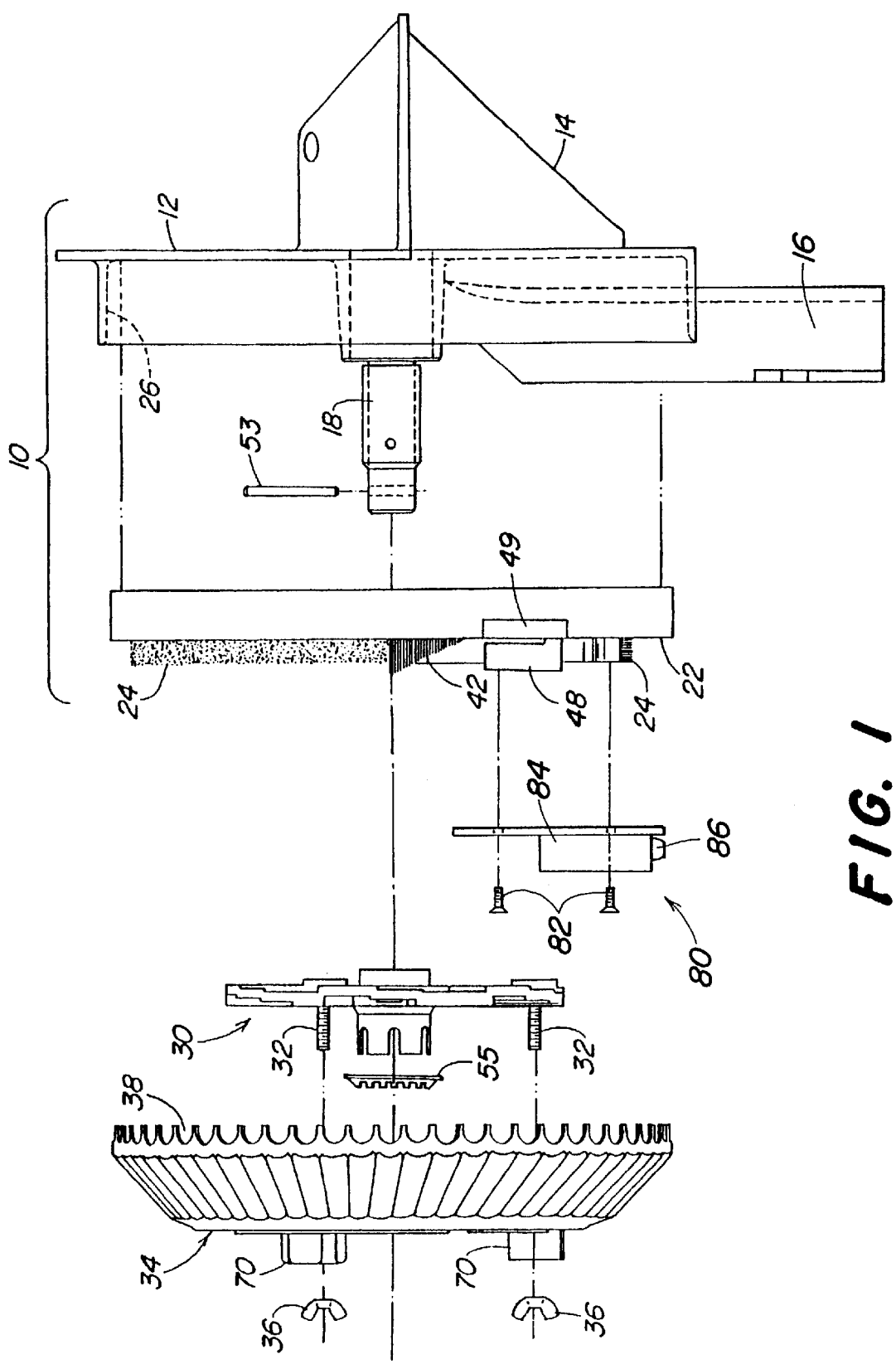
FIG. 1 is an exploded view of the subject seed meter.
Figure 2:
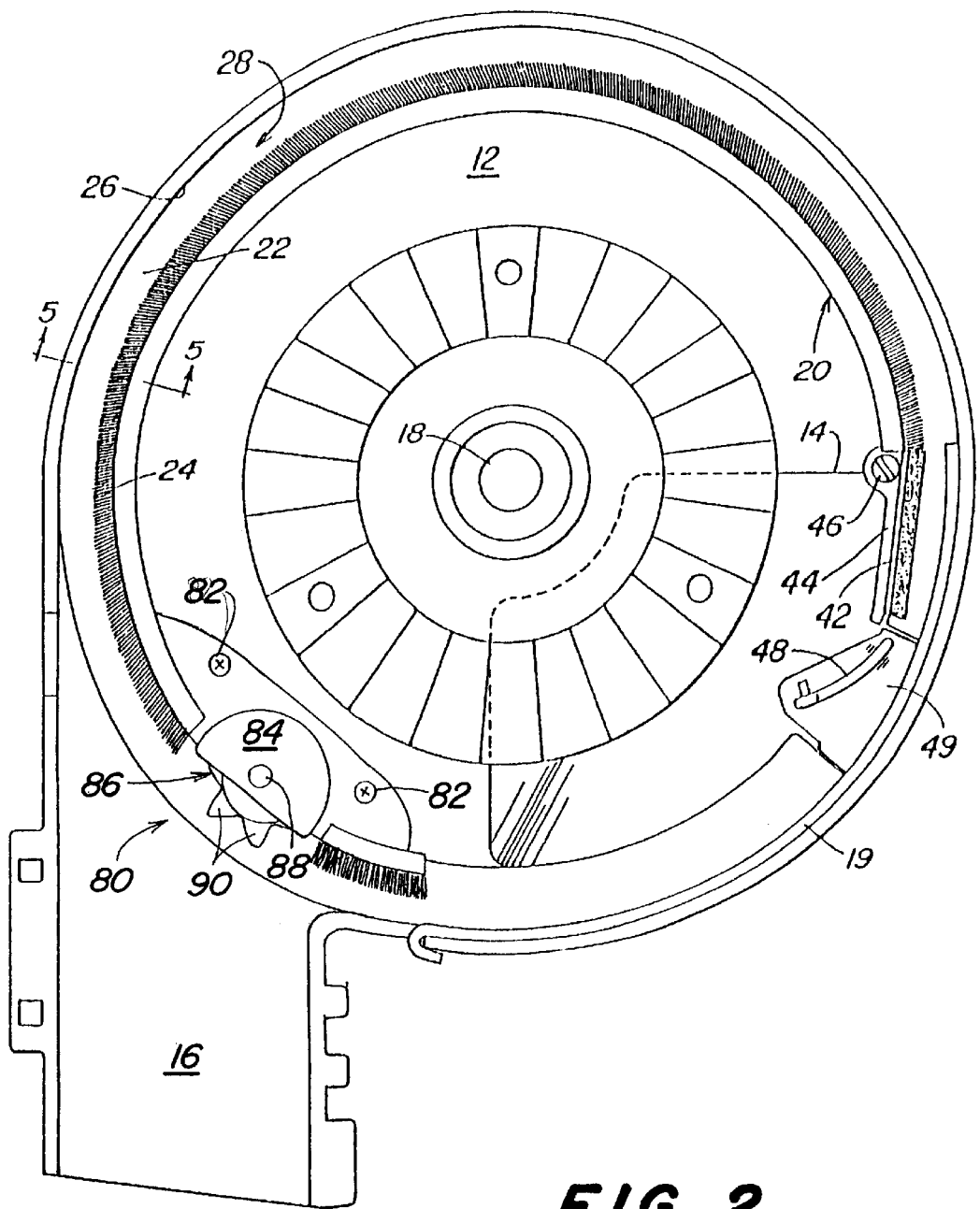
FIG. 2 is a side view of the housing and brush retainer ring.

FIG. 1 is an exploded view of a brush meter. The subject seed meter may be used on row crop planters, grain drills and air seeders. It is particularly useful in row crop planters and more specifically for use with soybeans and other crops. The meter comprises a stationary housing 10 having two elements. The first element is a solid metallic unit 12, which is provided with a seed inlet 14 and a seed outlet 16. Unit 12 is provided with an axially extending spindle 18. A wear strip 19 is mounted to the inner wall of unit 12 by tangs, not shown, that engage mounting holes in the unit. The wear strip is formed of resilient metal having a greater radius than the unit so that it stays in place when mounted to the unit.

Figure 5:
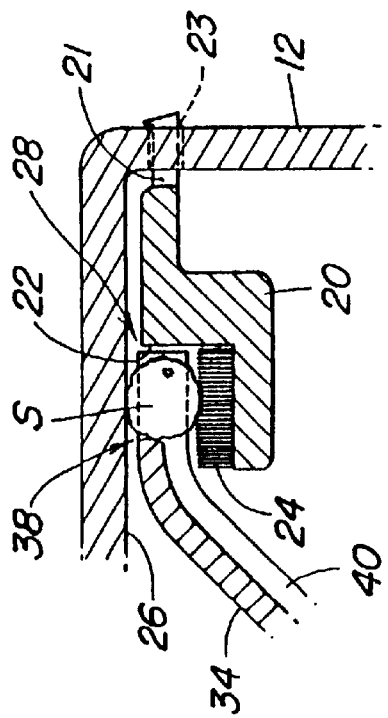
FIG. 5 is a cross sectional view taken along line 5—5 showing the seed trapping zone of the seed meter.

The second housing element comprises a replaceable plastic brush retainer ring 20 which is secured to the first housing element 12 by plastic tangs 21, see FIG. 5. Tangs 21 are received in receiving apertures 23 formed in unit 12. The plastic ring 20 comprises a first axial wall 22 and a radially extending brush 24. The first axial wall 22 and the radially extending brush 24 together with the outer radial wall 26 form a seed trapping zone 28 for trapping single seeds S. best shown in FIG. 5

Figure 3:
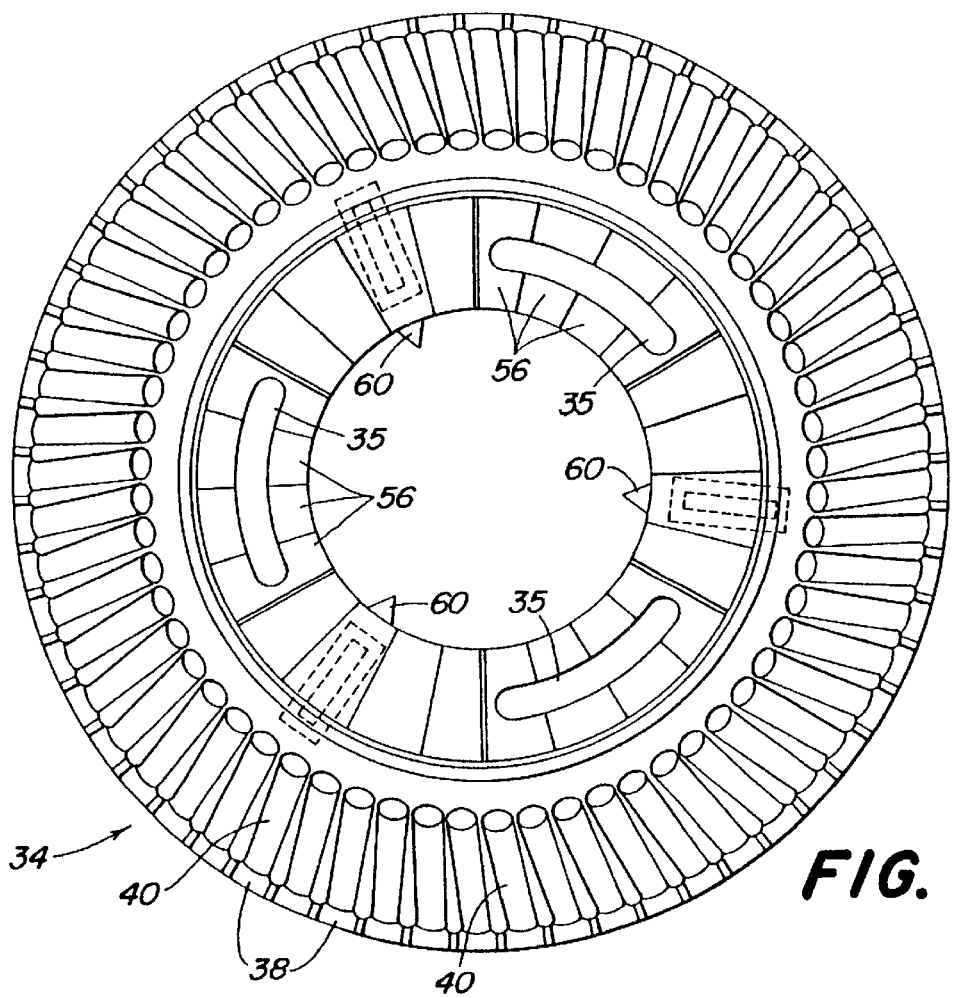
FIG. 3 is a side view of the bowl of the seed meter.
Figure 4:
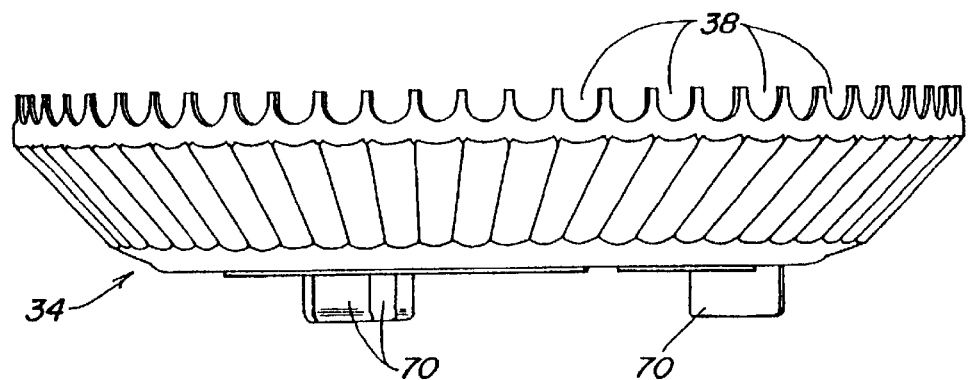
FIG. 4 is a front view of the bowl of the seed meter.

A hub 30 is rotatably mounted on spindle 18 and is provided with three screws 32. A circular member in the form of a bowl 34 is mounted to hub 30 by passing the screws 32 through curved slots 35 formed in the bowl and securing the bowl thereto by wing nuts 36. The bowl is best illustrated in FIGS. 3 and 4, it comprises a series of seed receiving cells 38 which are located around the axial periphery of the bowl. Each cell is provided with an inwardly extending groove 40, which helps to introduce, seeds into the seed receiving cell 38. The width and depth of the grooves becomes smaller as the groove approaches the seed receiving cell. As seen in FIG. 5, the seed receiving cells 38 form a second axial wall in the seed trapping zone to trap singled seeds. Although in the illustrated embodiment the circular member is a bowl, it should be noted that the circular member might have a disc or cylindrical configuration.

The brush retainer ring 20 adjacent to the seed puddle is provided with a flexible and resilient flap 48. The flap is provided with a base 49 that is mounted to the ring. The flap imparts a light downward force on the seed to maintain single seeds in the seed receiving cells. The ring is also provided with an axially extending brush 42 having a triangular configuration. This brush is located between the flap 48 and the seed trapping zone. This brush is held in place by a mounting plate 44. The mounting plate 44 is also provided with a screw 46 which is screwed into ring 20 for securing the mounting plate to the ring.

In operation, seeds from a seed reservoir are deposited in the seed meter through inlet 14. The seeds collect in a puddle formed between the seed bowl 34 and the stationary housing 10. As the bowl is rotated in a counterclockwise direction, seeds in the seed puddle are directed into the seed receiving cells 38 by the grooves 40. After a single seed has entered the seed receiving cells, the single seed is held in place by the flexible and resilient flap 48. The axially extending brush 42 drives the excess seeds away from the seed cells so that only one seed remains in each seed cell before it enters the seed trapping zone. As the seed enters the seed trapping zone it is forced radially outward by centrifugal force against the outer radial wall 26 which is formed in the unit 12. It is kept axially in place by the first axial wall 22 and the second axial wall formed by seed receiving cell 38. The radially extending brush 24 forms the inner radial wall of the seed trapping zone. Brush 24 holds the seed in the seed receiving cells when the meter is stopped and when gravity exceeds the centrifugal force of the rotating bowl acting on the seed. The brush 24 also provides a flexible area to compensate for overfilled seed receiving cells without breaking various components. As the seed enters the outlet area, the outer radial wall 26 falls away and forms part of the outlet 16. In this way the seed is dropped into the outlet. The outlet in turn is coupled to a seed tube, which directs metered seed into the planting furrow. To prevent seeds in the seed puddle from short circuiting the seed meter, the brush 24 extends past the meter outlet.

The seed knockout assembly 80 is integrally mounted to the brush ring 20 by screws 82. The knockout assembly comprises a housing 84 and a rotatable sprocket wheel 86. The sprocket wheel 86 is rotatably mounted on a shaft 88 located in the housing 84. In an alternative configuration the housing 84 and shaft 88 could be molded into the brush ring 20. The sprocket wheel 86 is provided with outwardly extending radial teeth 90 that are spaced to engage the individual seed receiving cells 38 of the bowl 34.

Figure 6:
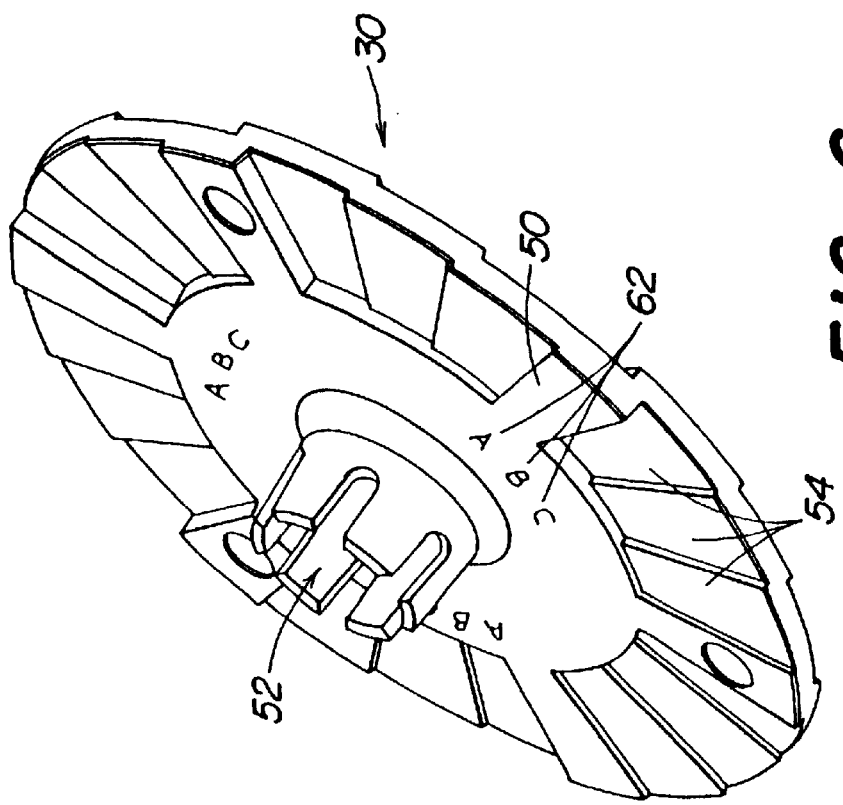
FIG. 6 is a perspective view of the hub.

The hub 30, best illustrated in FIGS. 1 and 6, is a plastic disk member 50 having an annular bore 52. The annular bore is mounted to spindle 18 and held in place by pin 53 and retaining ring 55. The periphery of the disk member 50 is provided with a series of steps 54, which correspond to steps 56 formed in the bowl 34. These steps comprise a means for adjusting the axial position of the bowl relative to the stationary housing 10. By adjusting the rotative position of the bowl 34 relative to the hub 30, the axial distance of the bowl 34 relative to the stationary housing 10 can be controlled. An indicator means comprising a pointer 60 on bowl 34 and indicator marks 62 on hub 30 are used to inform the farmer of the position of the bowl relative to the hub. By checking a chart the farmer can then determine the size of the individual seed trapping areas and change the relationship for different seed sizes. The spindle 18 is provided with a coupling member, not shown, for coupling the spindle to a source of rotative power for rotating the hub and bowl.

Finger catches 70 extend axially outwardly from the bowl and are used to assist the farmer in rotating the bowl relative to the hub when adjusting the axial position of the bowl relative to the hub. In addition the finger catches 70 are used to space the bowls when stacked to protect the seed receiving cells.

The present invention should not be limited by the above described embodiments, but should be limited solely by the claims that follow.

We claim:

1. A seed meter for an agricultural machine, the seed meter comprising:
    a stationary housing having an inlet for receiving seed and an outlet through which metered seed is dispensed;
    a circular member being rotatively mounted to the stationary housing, the circular member having a series of individual seed receiving cells for receiving and transporting individual seeds, the circular member defines an axis of rotation;
    seed entering the stationary housing through the inlet form a seed puddle between the stationary housing and the circular member, individual seeds located in this puddle are taken up by the seed receiving cells in the circular member as it is rotated through the puddle, seed in the seed receiving cells is released as the seed is rotated towards the outlet, wherein the stationary housing is further provided with an internal seed knockout assembly having a rotatable wheel for driving seed from the individual seed receiving cells to the outlet.

2. The seed meter as defined by claim 1 wherein the rotatable wheel is a sprocket wheel having outwardly extending radial teeth that enter the seed receiving cells.

3. The seed meter as defined by claim 2 wherein the stationary housing is provided with a radially extending brush.

4. The seed meter as defined by claim 3 wherein the radially extending brush is mounted to a replaceable ring.

5. The seed meter as defined by claim 4 wherein the internal seed knockout assembly is an integral part of the replaceable ring.

6. The seed meter as defined by claim 5 wherein the seed knockout assembly comprises the sprocket wheel and a housing that is mounted to the replaceable ring, the sprocket wheel being rotatively mounted to the housing.

7. The seed meter as defined by claim 6 wherein the circular member is a bowl with the seed receiving cells located about its outer periphery.

8. The seed meter as defined by claim 2 wherein the sprocket wheel is provided with a shaft on which it rotates, the shaft defining an axis that is parallel to the axis of rotation of the circular member.

9. A seed meter for an agricultural machine, the seed meter comprising:
    a stationary housing having an inlet for receiving seed and an outlet through which metered seed is dispensed, the stationary housing having a replaceable ring having a radially extending brush;
    a circular member being rotatively mounted to the stationary housing, the circular member having a series of individual seed receiving cells for receiving and transporting individual seeds;
    seed entering the stationary housing through the inlet form a seed puddle between the stationary housing and the circular member, individual seeds located in this puddle are taken up by the seed receiving cells in the circular member as it is rotated through the puddle, seed in the seed receiving cells is released as the seed is rotated towards the outlet, wherein the replaceable ring of the stationary housing is provided with an internal seed knockout assembly having a rotatable wheel for driving seed from the individual seed receiving cells to the outlet.

10. The seed meter as defined by claim 9 wherein the rotatable wheel is a sprocket wheel having outwardly extending radial teeth that enter the seed receiving cells.

11. The seed meter as defined by claim 10 wherein the sprocket wheel is provided with a shaft on which it rotates, the shaft defining an axis that is parallel to the axis of rotation of the circular member.

12. The seed meter as defined by claim 11 wherein the internal seed knockout assembly is an integral part of the replaceable ring.

13. The seed meter as defined by claim 12 wherein the seed knockout assembly comprises the sprocket wheel and a housing that is mounted to the replaceable ring, the sprocket wheel being rotatively mounted to the housing.

14. The seed meter as defined by claim 13 wherein the circular member is a bowl with the seed receiving cells located about its outer periphery.

15. A replaceable ring for a brush seed meter, the replaceable ring comprising:

a plastic ring;

a radially extending brush is mounted to the plastic ring;

an axially extending brush is mounted to the plastic ring;

a seed knockout assembly having a rotatable wheel is mounted to the plastic ring.

16. The replaceable ring as defined by claim 15 wherein the rotatable wheel is a sprocket wheel having outwardly extending radial teeth.

17. The replaceable ring as defined by claim 16 wherein the seed knockout assembly comprises the sprocket wheel and a housing that is mounted to the replaceable ring, the sprocket wheel being rotatively mounted to the housing.

* * * * *